W. B. BASCOM.
VEHICLE SEAT.
APPLICATION FILED MAY 8, 1909.

956,667.

Patented May 3, 1910.

2 SHEETS—SHEET 1.

WITNESSES:
B. Feuerlicht
Peter Ruddiman

Willard B. Bascom
INVENTOR

BY
Rob B Kilgore
ATTORNEY

W. B. BASCOM.
VEHICLE SEAT.
APPLICATION FILED MAY 8, 1909.
956,667.
Patented May 3, 1910.
2 SHEETS—SHEET 2.
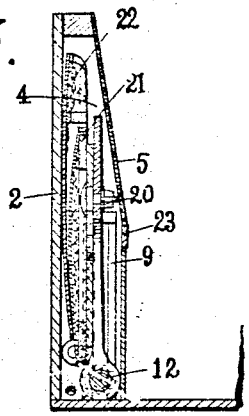
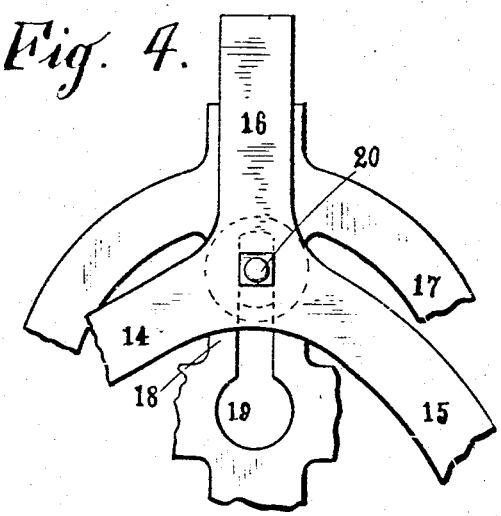
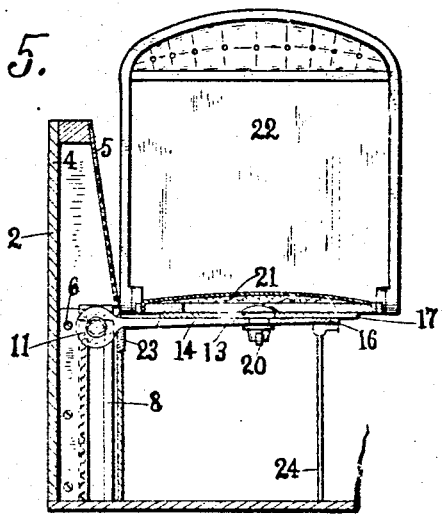
WITNESSES:
B. Feuerlicht
Peter Ruddiman
Willard B. Bascom
INVENTOR
BY
Ross B. Killgore
ATTORNEY

UNITED STATES PATENT OFFICE.

WILLARD B. BASCOM, OF NEW YORK, N. Y.

VEHICLE-SEAT.

956,667.

Specification of Letters Patent.

Patented May 3, 1910.

Application filed May 8, 1909. Serial No. 494,848.

*To all whom it may concern:*

Be it known that I, WILLARD B. BASCOM, a citizen of the United States, residing at Brooklyn borough, New York city, in the county of Kings and State of New York, have invented certain new and useful Improvements in Vehicle-Seats, of which the following is a specification.

My invention relates to folding seats for vehicles and is particularly adapted for use in automobiles and my objects are the construction and operation of such seats in a manner which will permit them to be entirely out of the way and out of sight when not in use but which, when in use, will be clear of the rear seat and sides of the car thereby making them more comfortable to the users than the seats now in use.

I attain my objects in the manner illustrated in the accompanying drawing in which—

Figure 1:
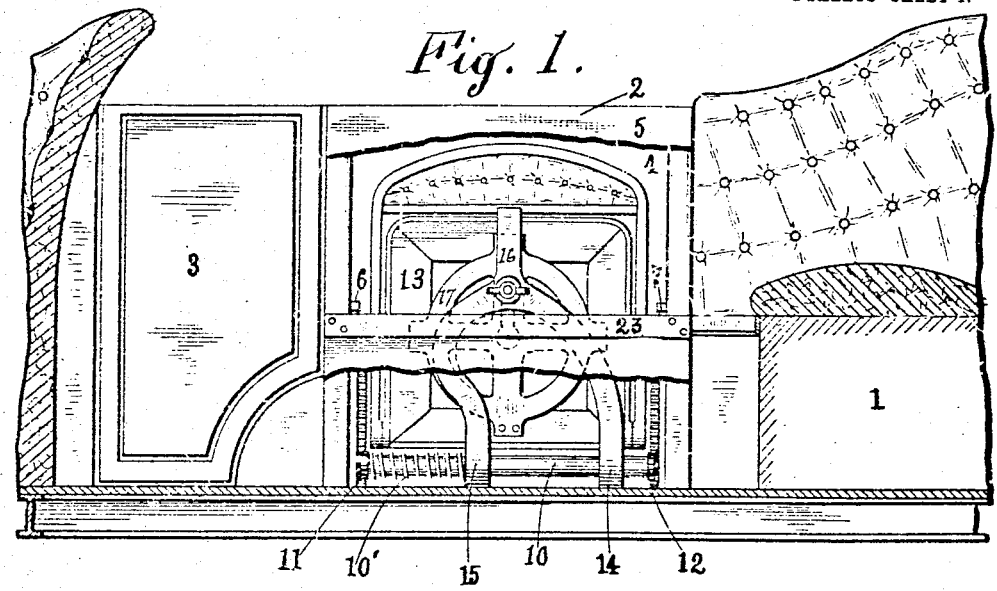
Figure 2:
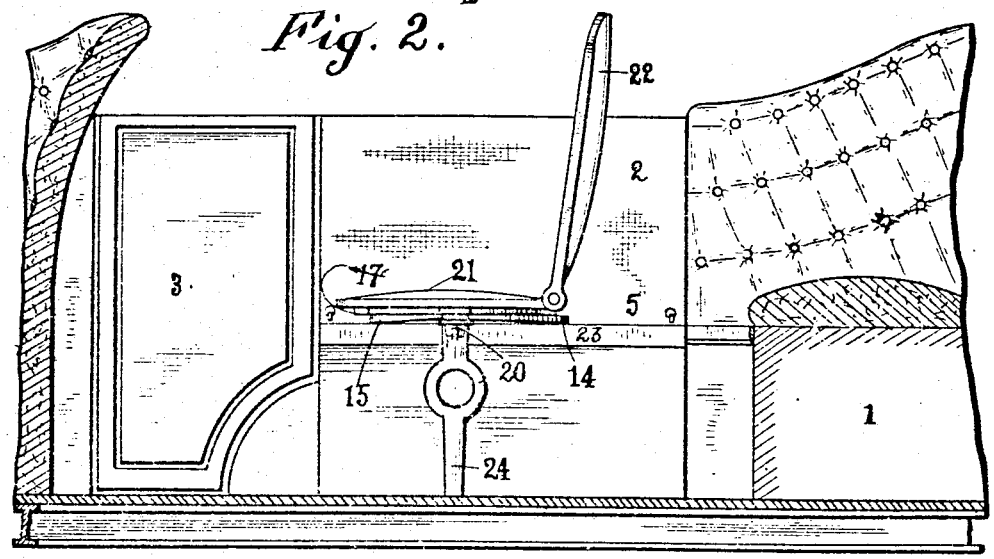

Figure 1 is a view of my seat attached to the tonneau of an automobile in its folded position; Fig. 2 a view of the seat open for use; Fig. 3 a sectional view of the seat folded; Fig. 4 a detail of the supports; and Fig. 5 a view of the seat, partly in section, in position to be slid away from the side of the car.

In the embodiment shown in the drawing the touring body of the car is provided with the usual rear seat 1, side wall 2 and door 3. A pocket or recess 4 is made in the upholstery of the side wall (or in the door if preferred) to receive the folded seat and a flap 5 covers and conceals the seat when it is not in use. Rack bars 6 and 7 with strips 8 and 9 spaced therefrom form guideways with closed tops within which a shaft 10 provided with pinions 11 and 12 is vertically movable, the pinions meshing with the guideracks so that the motion will be even and cramping and binding avoided. A support 13 in the general shape of a yoke provided with branches 14, 15 and 16 is secured to the shaft 10 at the ends of the branches 14 and 15 by eyes thereon through which the shaft extends and within which the shaft may revolve. This yoke piece is slidable on the shaft 10 and a spring 10' forces it to one end of the shaft while a suitable catch holds it at the other end of the shaft against the compression of the spring when the seat is pushed forward. A bar 23 across the recess forms a rest or support for the yoke when the seat is in use, the shaft 10 resting against the top of the guideways. At the junction of the branches of the yoke a turntable 17 is secured. This turntable is preferable in the form of a ring with spokes, one of which spokes 18 is provided with a key hole slot 19 the enlargement of which is coincident with the center of the ring. A bolt 20 with a flattened shank is secured in the yoke piece with the flattened sides in the narrow part of the keyhole slot thereby permitting the turntable to slide on the yoke piece but preventing rotation of the turntable until the slot has been pushed along the bolt to the enlargement. A seat 21 is secured to the turntable and a back 22 is hinged to the seat. A leg 24 may be hinged to the yoke piece and is perforated to clear the bolt 20 when the seat is folded.

In use the flap 5 is raised and the entire seat pulled upward the bar 10 running evenly on the racks and pinions. The seat is then laid down on the bar 23, the turntable 17 pulled forward in the key hole slot to get the seat away from the side of the car and when the flat shanked bolt has reached the enlargement the entire seat can be revolved through 90° so that it will face forward. The back can be turned up and the whole seat slid forward on the shaft 10 to clear the rear seat 1.

By this mechanism I am enabled to construct a seat which will fold into a recess three inches deep in the side of the car and which, when closed, gives no hint of its presence. In use I have a full sized seat spaced from the rear seat and from the side walls of the car thereby enhancing the comfort of the occupants of the car. As the seat is on a turntable the occupant may face in any direction without discomfort.

The drawing shows but one embodiment of my invention and the mechanical details may be greatly varied without departing from the scope of my invention.

I claim:—

1. A folding seat for vehicles comprising vertical guideways adapted to be secured to a vehicle, a seat support movable in said guideways, a seat on said support adapted to be moved with the support to or from a horizontal position and also adapted to be moved on the support to space the same from the guideways when in use, and means for supporting the seat in a horizontal plane when in use.

2. A folding seat for vehicles comprising vertical guideways adapted to be secured to a vehicle, a support shaft movable vertically in the guideways, a yoke adapted to be moved with the shaft to or from a horizontal position, a turntable carried on the yoke and slidable thereon to space the same from the guides when the seat is in use, a seat on the turntable, and means for supporting the seat in a horizontal plane when in use.

3. A folding vehicle seat comprising vertical guideways adapted to be secured to a vehicle; a shaft movable vertically in said guideways; a yoke movable with and revoluble on said shaft; a turntable provided with a slot movably mounted on the yoke through the slot; a seat on the turntable; and means for supporting the seat in a horizontal plane when in use.

4. A folding vehicle seat comprising vertical guideways adapted to be secured to a vehicle; a shaft movable in said guideways; a yoke revoluble and slidable on said shaft; a turntable on said yoke; a seat on the turntable; and means for supporting the seat in a horizontal plane when in use.

5. A folding vehicle seat comprising a seat support; a turntable provided with a keyhole slot mounted thereon; a stud or bolt with a flattened shank secured to the support and extending through the slot whereby the turntable may be slid along the support and revolved thereon when the stud has engaged the enlargement in the slot.

6. A folding seat for vehicles comprising a vertical guideway adapted to be secured to a vehicle; a rack in the guideway; a shaft movable in the guideway; a pinion on the shaft engaging the rack; a seat support revolubly mounted on the shaft and means for holding the support in a horizontal plane when in use.

7. In a folding seat for vehicles, the combination of a recess in the side of the vehicle, a guide in the recess, a seat support engaging the guide and adapted to lie vertically in the recess when not in use and capable of being turned to a horizontal plane when in use, means upon which said support is movable forwardly, means upon which said support is movable sidewise, means for holding said support in a horizontal plane when in use and a seat on the support.

In testimony whereof I have affixed signature in presence of two witnesses.

WILLARD B. BASCOM.

Witnesses:
  Leo H. Rosenbaum,
  Robt. B. Killgore.